United States Patent Office 3,213,075
Patented Oct. 19, 1965

3,213,075
PREVENTION OF COLD FLOW IN
POLYBUTADIENE
Richard J. Sonnenfeld, Bartlesville, Okla., assignor to Phillips Petroleum Company, a corporation of Delaware
No Drawing. Filed Jan. 25, 1963, Ser. No. 253,993
14 Claims. (Cl. 260—94.4)

This invention relates to a method for preventing or substantially reducing the tendency of certain polybutadienes to cold flow. In one aspect, it relates to a novel composition comprising a polybutadiene and a treating agent which reduces the tendency of the polybutadiene to cold flow.

A great deal of research work has been conducted during the last few years with the object of producing improved rubbery polymers. One of the products that has attracted widespread attention because of its superior properties is a polybutadiene containing a high percentage, e.g., at least 85 percent, of cis 1,4-addition. Another polymer that has achieved considerable importance is a polybutadiene prepared by polymerizing 1,3-butadiene with an organolithium catalyst. The physical properties of these polymers are of such a nature that they are particularly suitable for the fabrication of automobile and truck tires and other articles for which conventional synthetic polymers have heretofore been comparatively unsatisfactory. However, in the processing of the polymers, particularly in packaging, shipping and storage, a certain amount of difficulty has been encountered because of the tendency of the polymers to cold flow when in the unvulcanized state. For example, if cracks or punctures develop in the package used in storing the polymers, polymer will flow from the packages with a resulting loss or contamination and sticking together of the stacked packages.

It is an object of this invention, therefore, to provide a method for eliminating or substantially reducing the tendency of cis-polybutadiene and organolithium-catalyzed polybutadiene to cold flow when in the unvulcanized state.

Another object of the invention is to provide a method for producing a cis-polybutadiene or an organolithium-catalyzed polybutadiene so as to provide products which have a reduced tendency to cold flow.

Still another object of the invention is to provide a novel composition which contains cis-polybutadiene or an organolithium-catalyzed polybutadiene and a treating agent which prevents or substantially reduces cold flow.

Other and further objects and advantages of the invention will become apparent to those skilled in the art upon consideration of the accompanying disclosure.

The present invention is concerned with the production of improved polybutadiene products which have a reduced tendency to cold flow. Thus, the invention resides in an improvement in a process for polymerizing 1,3-butadiene with a catalyst system selected from the group consisting of (1) a catalyst formed by mixing materials comprising an organometal and an iodine-containing component, and (2) an organolithium catalyst. Broadly speaking, the improvement comprises adding to the polymerization mixture a liquid xanthate-, thioxanthate-, or dithiocarbamate-telechelic polymer. The term "telechelic" polymer has been coined to identify polymers in which the molecules possess two or more functional terminal groups. A functional group is identified as a radical according to standard nomenclature practice and is used as a prefix. Thus, in this specification and in the claims, the terms "xanthate-telechelic polymer," "thioxanthate-telechelic polymer," and "dithiocarbamate-telechelic polymer" refer to polymers of polymerizable vinylidene-containing monomers in which xanthate, thioxanthate and dithiocarbamate groups, respectively, are situated on the ends of the polymer molecules. The addition of the treating agent of this invention, i.e., the liquid telechelic polymer, to the polymerization reaction mixture also results in the inactivation of the catalyst and termination of the polymerization reaction. When polymerizing butadiene with an organometal-type catalyst, the reaction is normally terminated or shortstopped when the conversion has reached a desired level by the addition of a catalyst-inactivating agent. Compounds that have been used in this manner include a variety of materials, such as water, alcohols and rosin acids. These materials are effective shortstopping agents, but the product produced has a tendency to cold flow when in the unvulcanized state. It was completely unexpected, therefore, when it was found that the treating agent of this invention, which also functions as a shortstopping agent, resulted in a polybutadiene product having a reduced tendency to cold flow. Furthermore, the valuable properties characteristic of cis-polybutadiene and organolithium-catalyzed polybutadiene vulcanizates are retained when proceeding in accordance with the present invention.

In accordance with the above-described embodiment of the invention, the treating agent is added to the polymerization reaction mixture when the desired conversion is attained. The liquid telechelic polymer is usually charged by itself to the reaction mixture. However, it can also be used as a solution in a hydrocarbon, preferably similar to the hydrocargon diluent employed in the polymerization. The treating agent is effective at whatever temperature is employed in the polymerization. However, sufficient contact time with the polymer solution must be allowed in order to achieve an optimum reduction in cold flow. The contact time is dependent, at least to a certain extent, upon the temperature, a longer time generally being required as the temperature is lowered. The contact time is usually in the range of 5 minutes to 50 hours. At the end of the contact period, the polymer can be recovered by any conventional means. For example, the polymer can be coagulated with a suitable reagent, such as an alcohol, or the solvent can be removed by steam stripping.

It is also within the scope of the invention to use a conventional shortstopping agent in conjunction with the treating agent. Examples of conventional shortstopping agents include water, alcohols, inorganic acids, rosin acids, hydroquinone, and the like. These shortstopping agents are usually used in cases where the amount of the present treating agent employed is insufficient to completely inactivate the catalyst, and they are preferably added to the polymerization reaction mixture after the desired contacting with the treating agent. However, the conventional shortstopping agents can be added at any time so long as they do not completely inhibit the action of the treating agents of this invention.

The amount of the treating agent employed can vary over a relatively wide range, e.g., from about 0.1 to about 50 parts by weight per 100 parts by weight of the polymer. It is usually preferred to use from 1 to 20 parts by weight of the treating agent per 100 parts by weight of the polymer.

The liquid telechelic polymers used as treating agents in the practice of the present invention can also be described as being polymers of conjugated dienes containing end groups selected from the group consisting of

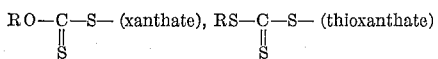

and

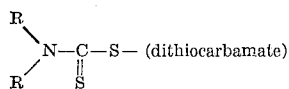

wherein R can be an alkyl, cycloalkyl, aryl, alkaryl, or aralkyl radical, preferably containing from 1 to 8, inclusive, carbon atoms. The polymers are prepared by emulsion polymerization. The term "emulsion" is to be construed in its broadest sense, that is, as denoting the presence of an aqueous phase and an oil phase without regard to the extent of dispersion of one in the other. Emulsion polymerization is carried out in an aqueous dispersion, that is, the monomers are dispersed in water usually with the aid of a dispersing or emulsifying agent and agitation. Emulsifying agents which are suitable for this purpose include partially or completely neutralized fatty acid soaps, sodium lauryl sulfate, sodium isobutylnaphthalene sulfonate, sulfated and sulfonated succinic esters and the like.

The monomers that can be employed in the preparation of the telechelic polymers include conjugated dienes containing from 4 to 12, preferably from 4 to 8 carbon atoms per molecule. Examples of suitable conjugated dienes include 1,3-butadine, isoprene, piperylene, methylpentadiene, 2,3-dimethyl-1,3-butadiene, phenylbutadiene, 3,4-dimethyl-1,3-hexadiene, 4,5-diethyl-1,3-octadiene, and the like. Conjugated dienes containing reactive substituents along the chain can also be employed, such as, for example, halogenated dienes, such as chloroprene, and the like. Of the conjugated dienes the preferred material is 1,3-butadiene, with isoprene and piperylene also being especially suitable. In addition to homopolymers of conjugated dienes, the telechelic polymers used in the practice of the invention also include copolymers of conjugated dienes with copolymerizable vinylidene monomers. Comonomers which can be employed are aryl-substituted olefins such as styrene, various alkyl styrenes, vinylnaphthalene, vinyltoluene and the like.

In the polymerization, any recipe can be used in which a compound corresponding to Formula I or II shown below will function as a modifier. Polymerization systems which are applicable are those that generate free radicals, e.g., oxidation-reduction systems. Oxidants which can be employed include hydrogen peroxide and organic peroxides or hydroperoxides. Among the reductants which can be used are ferrous pyrophosphate, polyalkylene polyamines such as tetraethylene pentamine which can be used alone or in conjunction with hydrazine or substituted hydrazines, carbonates of polyalkylene polyamines, sodium formaldehyde sulfoxylate, and the like. Examples of suitable polymerization systems and recipes are given in U.S. Patent 2,720,510, to Rothlisberger et al.

The modifiers which are employed in this invention are selected from the group consisting of xanthogen disulfides, thioxanthogen disulfides, and thiuram disulfides. These compounds can be represented by the formulas

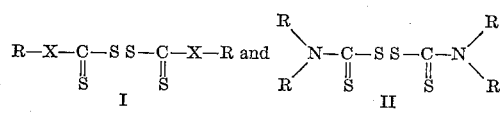

wherein R can be an alkyl, cycloalkyl, aryl, alkaryl, or aralkyl radical containing from one to eight carbon atoms and X is oxygen or sulfur. Formula I represents xanthogen disulfides and thioxanthogen disulfides while Formula II represents thiuram disulfides. Exemplary of these compounds are diisopropylxanthogen disulfide, di-n-butylxanthogen disulfide, di-n-propylthioxanthogen disulfide, diisopropylthioxanthogen disulfide, diphenylthioxanthogen disulfide, dimethylxanthogen disulfide, methylethylxanthogen disulfide, dicyclohexylxanthogen disulfide, n-propyl-(cyclohexyl)xanthogen disulfides, di-p-tolylxanthogen disulfide, dibenzylxanthogen disulfide, ethyl(n-butyl)thioxanthogen disulfide, dihexylthioxanthogen disulfide, dioctylthioxanthogen disulfide, octyl(phenyl)thioxanthogen disulfide, methyl(benzyl)thioxanthogen disulfide, di(2,4-dimethylphenyl)thioxanthogen disulfide, dicyclopentylthioxanthogen disulfide, tetraethylthiuram disulfide, tetraisopropylthiuram disulfide, tetra-n-butylthiuram disulfide, and tetraoctylthiuram disulfide, and tetramethylthiuram disulfide. These modifiers are applicable in any emulsion polymerization systems where modifiers are normally employed. As mentioned above, the liquid telechelic polymers contain end groups selected from the group consisting of

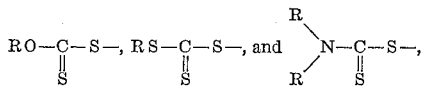

depending upon the type of modifier used. The particular end groups attached to a polymer molecule will depend upon the type of modifier employed in the polymerization. The amount of modifier employed is generally in the range of 0.05 to 10.0 parts by weight per 100 parts by weight of monomer.

The treating agent of this invention is applicable to the process for preparing a polybutadiene containing a high percentage of cis 1,4-addition. The cis-polybutadiene can be prepared by polymerizing butadiene with a catalyst system which is formed by mixing materials comprising an organometal compound and iodine, present either in the free or combined state. This polymerization system produces a cis-polybutadiene having outstanding physical properties when in the cured state but having a tendency to cold flow in the unvulcanized state. The term "cis-polybutadiene" as used herein is intended to include a polybutadiene containing at least 85 percent cis 1,4-addition, e.g., from 85 to 98 percent and higher.

The cis-polybutadiene can be prepared by polymerizing 1,3-butadiene with any one of a large number of different stereospecific catalyst systems. It is usually preferred to employ a catalyst which is selected from the group consisting of (1) a catalyst formed by mixing materials comprising an organometal compound having the formula $R_mM$, wherein R is an alkyl, cycloalkyl, aryl, alkaryl, aralkyl, alkylcycloalkyl, cycloalkylalkyl, arylcycloalkyl or cycloalkylaryl radical, M is aluminum, mercury, zinc, beryllium, cadmium, magnesium, sodium or potassium and $m$ is equal to the valence of the metal M, and titanium tetraiodide, (2) a catalyst formed by mixing materials comprising an organometal compound having the formula $R_nM'$, wherein R is an organo radical as defined above, M' is aluminum, magnesium, lead, sodium or potassium, and $n$ is equal to the valence of the metal M', titanium tetrachloride and titanium tetraiodide, (3) a catalyst formed by mixing materials comprising an organometal compound having the formula $R_aM''$, wherein R is an organo radical as defined above, M'' is aluminum or magnesium and $a$ is equal to the valence of the metal M'', a compound having the formula $TiX_b$, wherein X is chlorine or bromine and $b$ is an integer from 2 to 4, inclusive, and elemental iodine, (4) a catalyst formed by mixing materials comprising an organometal compound having the formula $R_xM'''$, wherein R is an organo radical as defined above, M''' is aluminum, gallium, indium or thallium, and $x$ is equal to the valence of the metal M''', a titanium halide having the formula $TiX_4$, wherein X is chlorine or bromine, and an inorganic halide having the formula $M^{IV}I_c$, wherein $M^{IV}$ is beryllium, zinc, cadmium, aluminum, gallium, indium, thallium, silicon, germanium, tin, lead, phosphorus, antimony, arsenic, and bismuth, and $c$ is an integer from 2 to 5, inclusive, and (5) a catalyst formed by mixing materials comprising an organo compound having the formula $R_xM'''$, wherein R, $M'''$ and $x$ are as defined above, titanium tetraiodide, and an inorganic halide having the formula $M^VX_d$, wherein $M^V$ is aluminum, gallium, indium, thallium, germanium, tin, lead, phosphorus, antimony, arsenic or bismuth, X is chlorine or bromine, and $d$ is an integer from 2 to 5, inclusive. The R radicals of the aforementioned formulas preferably contain up to and including 20 carbon atoms.

The following are examples of preferred catalyst systems which can be used to polymerize 1,3-butadiene to a cis 1,4-polybutadiene: triisobutyl-aluminum and titanium tetraiodide; triethylaluminum and titanium tetraiodide; triisobutylaluminum, titanium tetrachloride and titanium tetraiodide; triethylaluminum, titanium tetrachloride and titanium tetraiodide; diethylzinc and titanium tetraiodide; dibutylmercury and titanium tetraiodide; triisobutylaluminum, titanium tetrachloride and iodine; triethylaluminum, titanium tetrabromide and iodine; n-amylsodium and titanium tetraiodide; phenylsodium and titanium tetraiodide; n-butylpotassium and titanium tetraiodide; phenylpotassium and titanium tetraiodide; n-amylsodium, titanium tetrachloride and titanium tetraiodide; triphenylaluminum and titanium tetraiodide; triphenylaluminum, titanium tetraiodide and titanium tetrachloride; triphenylaluminum, titanium tetrachloride and iodine; tri - alpha - naphthylaluminum, titanium tetrachloride and iodine; tribenzylaluminum, titanium tetrabromide and iodine; diphenylzinc and titanium tetraiodide; di-2-tolylmercury and titanium tetraiodide; tricyclohexylaluminum, titanium tetrachloride and titanium tetraiodide; ethylcyclopentylzinc and titanium tetraiodide; tri(3-isobutylcyclohexyl)aluminum and titanium tetraiodide; tetraethyllead, titanium tetrachloride and titanium tetraiodide; trimethylphenyllead, titanium tetrachloride and titanium tetraiodide; diphenylmagnesium and titanium tetraiodide; di-n-propylmagnesium, titanium tetrachloride and titanium tetraiodide; dimethylmagnesium, titanium tetrachloride and iodine; diphenylmagnesium, titanium tetrabromide and iodine; methylethylmagnesium, and titanium tetraiodide; dibutylberyllium and titanium tetraiodide; diethylcadmium and titanium tetraiodide; diisopropylcadmium and titanium tetraiodide; triisobutylaluminum, titanium tetrachloride, and antimony triiodide; triisobutylaluminum, titanium tetrachloride and aluminum triiodide; triisobutylaluminum, titanium tetrabromide, and aluminum triiodide; triethylaluminum, titanium tetrachloride and phosphorus triiodide; tri-n-dodecylaluminum, titanium tetrachloride, and tin tetraiodide; triethylgallium, titanium tetrabromide, and aluminum triiodide; tri-n-butylaluminum, titanium tetrachloride, and antimony triiodide; tricyclopentylaluminum, titanium tetrachloride, and silicon tetraiodide; triphenylaluminum, titanium tetrachloride, and gallium triiodide; triisobutylaluminum, titanium tetraiodide and tin tetrachloride; triisobutylaluminum, titanium tetraiodide and antimony trichloride; triisobutylaluminum, titanium tetraiodide and aluminum trichloride; triisobutylaluminum, titanium tetraiodide, and tin tetrabromide; triethylgallium, titanium tetraiodide, and aluminum tribromide; triethylaluminum, titanium tetraiodide, and arsenic trichloride; and tribenzylaluminum, titanium tetraiodide, and germanium tetrachloride.

The polymerization process for preparing cis-polybutadiene is generally carried out in the presence of a hydrocarbon diluent which is not deleterious to the catalyst system. Examples of suitable diluents include aromatic, paraffinic and cycloparaffinic hydrocarbons, it being understood that mixtures of these materials can also be used. Specific examples of hydrocarbon diluents include benzene, toluene, n-butane, isobutane, n-pentane, iso- octane, n-dodecane, cyclopentane, cyclohexane, methylcyclohexane, and the like. It is often preferred to employ aromatic hydrocarbons as the diluent.

The amount of the catalyst employed in polymerizing 1,3-butadiene to a cis-polybutadiene can vary over a rather wide range. The amount of the organometal used in forming the catalyst composition is usually in the range of 0.75 to 20 mols per mol of the halogen-containing component, i.e., a metal halide with or without a second metal halide or elemental iodine. The mol ratio actually used in a polymerization will depend upon the particular components employed in the catalyst system. However, a preferred mol ratio is generally from 1:1 to 12:1 of the organometal compound to the halogen-containing component. When using a catalyst comprising an organometal compound and more than one metal halide, e.g., titanium tetrachloride and titanium tetraiodide, titanium tetrachloride or tetrabromide and aluminum iodide, the mol ratio of the tetrachloride or tetrabromide to the iodide is usually in the range of 0.05:1 to 5:1. With a catalyst system comprising an organometal compound, a titanium chloride or bromide and elemental iodine, the mol ratio of titanium halide to iodine is generally in the range of 10:1 to 0.25:1, preferably 3:1 to 0.25:1. The concentration of the total catalyst composition, i.e., organometal and halogen-containing component, is usually in the range of 0.01 to 10 weight percent, preferably in the range of 0.01 to 5 weight percent, based on the total amount fo 1,3-butadiene charged to the reactor system.

The process for preparing cis-polybutadiene can be carried out at temperatures varying over a rather wide range, i.e., from —100 to 250° F. It is usually preferred to operate at a temperature in the range of —30 to 160° F. The polymerization reaction can be carried out under autogenous pressure or at any suitable pressure sufficient to maintain the reaction mixture substantially in the liquid phase. The pressure will thus depend upon the particular diluent employed and the temperature at which the polymerization is conducted. However, higher pressures can be employed if desired, these pressures being obtained by some such suitable method as the pressurization of the reactor with a gas which is inert with respect to the polymerization reaction.

The present invention is also applicable to the process for polymerizing 1,3-butadiene with an organolithium compound. The polybutadienes prepared with an organolithium catalyst generally contains from 35 to 48 percent cis 1,4-addition, from 45 to 55 percent trans 1,4-addition, and from 6 to 10 percent 1,2-addition. The present invention is particularly applicable to low inherent viscosity polybutadienes prepared by this method. Such polymers generally have an inherent viscosity in the range of 0.75 to 3. While the low inherent viscosity polybutadienes possess outstanding properties, they have a tendency to cold flow when in the unvulcanized state.

Organolithium compounds suitable for use in the polymerization have the formula $RLi_x$, wherein R is a hydrocarbon radical selected from the group consisting of aliphatic, cycloaliphatic and aromatic radicals and $x$ is an integer from 1 to 4, inclusive. The R in the formula has a valence equal to the integer and preferably contains from 1 to 20, inclusive, carbon atoms, although higher molecular weight compounds can be utilized. In preparing the polybutadiene, it is often preferred to use an alkyllithium compound, such as n-butyllithium, as the catalyst. Examples of other suitable organolithium compounds include methyllithium, isopropyllithium, tertoctyllithium, n-decyllithium, phenyllithium, naphthyllithium, 4-butylphenyllithium, p-tolyllithium, 4-phenylbutyllithium, cyclohexyllithium, 4-butylcyclohexyl-lithium, 4-cyclohexylbutyllithium, dilithiomethane, 1,10-dilithiodecane, 1,20-dilithioeicosane, 1,4-dilithiocyclohexane, 1,4-dilithio-2-butene, 1,8-dilithio-3-decene, 1,4- dilithiobenzene, 1,5-dilithionaphthalene, 1,2-dilithio-1,2-diphenylethane, 9,10-dilithio-9,10-dihydroanthracene, 1,2-dilithio- 1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5-tetralithio-4-hexylanthracene, and the like.

The process used in preparing the organolithium-catalyzed polybutadiene can be conducted at a temperature in the range of −100 to 250° F., preferably at a temperature in the range of 0 to 180° F. The polymerization reaction can be carried out under autogenous pressures. It is usually desirable to operate at a pressure sufficient to maintain the reaction mixture in the liquid phase. The polymerization is conducted in the presence of a hydrocarbon diluent similar to that employed in the cis-polybutadiene polymerization process as described hereinbefore. The actual pressure used in the process will depend upon the particular diluent employed and the temperature at which the polymerization is to be conducted.

A polybutadiene having a desired inherent viscosity can be readily prepared by varying the concentration of the organolithium compound. For example, with a completely dry system and no other impurities present to destroy the organolithium compound, about 7 millimoles of effective catalyst per 100 grams of monomer (mhm.) is generally required to give a polymer having an inherent viscosity of 0.75, and about 0.25 millimole of effective catalyst per 100 grams of monomer is generally required for the production of a polymer having an inherent viscosity of 3.0. It has been found that for practical operations approximately 0.3 mhm. or more of catalyst is needed as a scavenger for the system.

Various materials are known to be detrimental to the organolithium catalyst and to the catalyst employed in preparing the cis-polybutadiene. These materials include carbon dioxide, oxygen and water. It is usually desirable, therefore, that the butadiene and diluent be freed of these materials as well as other materials which may tend to inactivate the catalyst. Furthermore, it is desirable to remove air and moisture from the reaction vessel in which the polymerization is to be conducted. Upon completion of the polymerization reaction in which cis-polybutadiene or the organolithium-catalyzed polybutadiene is prepared, the reaction mixture is then treated to inactivate the catalyst and recover the rubbery polymer. In accordance with the present invention, the catalyst is inactivated by adding the liquid telechelic polymer to the reaction mixture. After this treatment of the reaction mixture, the polymer is then recovered by conventional methods, such as stream stripping, alcohol coagulation or the like. It has been found to be advantageous to add an antioxidant, such as 4,4′-methylene-bis-(2,6-di-tert-butylphenol), to the polymer solution prior to recovery of the polymer.

A more comprehensive understanding of the invention may be obtained by referring to the following illustrative examples which are not intended, however, to be unduly limitative of the invention.

EXAMPLE I

Butadiene was polymerized with a catalyst system that was formed by mixing triisobutylaluminum, iodine, and titanium tetrachloride. This system produced a polymer containing about 95 percent cis 1,4-addition. The following recipe was employed in the polymerization:

| | Parts by weight |
|---|---|
| 1,3-butadiene | 100 |
| Toluene | 1200 |
| Triisobutylaluminum | 0.475 |
| Iodine | 0.152 |
| Titanium tetrachloride | 0.065 |
| Temperature, ° C. | 5 |
| Time, hrs. | 2 |

The procedure followed was to charge the toluene first, after which the reactor was purged with nitrogen. The butadiene was then added, followed by the triisobutylaluminum, iodine and titanium tetrachloride in that order. The reactor was then placed in a constant temperature bath at 5° C. for a period of 2 hours. At that time a portion of the contents of the reactor was removed and the reaction was shortstopped and the polymer coagulated with isopropyl alcohol. In the shortstopping procedure, sufficient isopropyl alcohol containing 10 weight percent of an antioxidant was used to give 1 part by weight of antioxidant per 100 parts by weight of the polymer. The reaction mixture was then steam stripped in order to remove the diluent after which the polymer was dried. This polymer sample was used as the control.

The remaining contents of the reactor was treated with a liquid xanthate-telechelic polymer in accordance with the present invention. The liquid xanthate-telechelic polymer was prepared by polymerizing butadiene in accordance with the following recipe:

| | Parts by weight |
|---|---|
| Butadiene | 100 |
| Water | 200 |
| Potassium fatty acid soap | 5.0 |
| Potassium hydroxide | 0.03 |
| Potassium chloride | 0.5 |
| Questex 4 SW [1] | 0.058 |
| Sodium formaldehyde sulfoxylate dihydrate | 0.09 |
| Ferrous sulfate heptahydrate | 0.018 |
| p-Menthane hydroperoxide | 0.27 |
| Toluene (for charging modifier) | 6.28 |
| Diisopropyl xanthogen disulfide (modifier) | 5.0 |
| Shortstop: DTBHQ [2] | 0.2 |
| Antioxidant: AO 2246 [3] | 2.0 |
| Reaction temperature, ° F. | 86–92 |

[1] Tetrasodium salt of ethylenediamine tetraacetic acid with 4 molecules of water of hydration.
[2] Di-tert-butylhydroquinone.
[3] 2,2′-methylene-bis-(4-methyl-6-tert-butylphenol).

The polymerization was stopped at 61 percent conversion after a period 20.5 hours. The liquid telechelic polymer was creamed with a 30 percent salt solution and isopropyl alcohol was added to complete separation of the polymer. The polymer was then washed three times with water and vacuum dried at about 200° F. The recovered polymer had a Brookfield viscosity of 600 poises at 25° C. and an inherent viscosity of 0.25.

An amount of the xanthate telechelic polymer was added to the remaining contents of the reactor. The treating agent acted as a shortstopping agent, thereby terminating the reaction. After a contact period of 15 hours at a temperature of 50° C., the polymer was coagulated from solution by adding isopropyl alcohol. Sufficient isopropyl alcohol containing 10 weight percent of an antioxidant was adapted in order to give 1 part by weigh of the antioxidant per 100 parts by weight of the polymer. The treated reaction mixture was then steam stripped to remove solvent, and the recovered polymer was dried. The results obtained in the runs are shown below in Table I.

Table I

| Run No. | Treating agent [1] | Cold flow, mg./min.[2] |
|---|---|---|
| 1 (Control) | | 12.7 |
| 2 | 8.0 | 8.3 |

[1] Parts by weight of xanthate-telechelic polymer per 100 parts by weight of cis-polybutadiene.
[2] Cold flow was measured by extruding the rubber through a ¼-inch orifice at 3.5 p.s.i. pressure and a temperature of 50° C. (122° F.). After allowing 10 minutes to reach steady state, the rate of extrusion was measured and the values reported in milligrams per minute.

EXAMPLE II

A series of runs was conducted in which an organolithium-catalyzed polybutadine was treated in accordance with the process of this invention. The organolithium-catalyzed polybutadiene was prepared by polymerizing 1,3-butadiene in accordance with the following recipe:

| | Parts by weight |
|---|---|
| 1,3-butadiene | 100 |
| Cyclohexane | 780 |
| n-Butyllithium (n-BuLi) | Variable |
| Ttmperature, °C. | 50 |
| Time, hrs. | 5 |

The procedure followed in each of the runs was to charge the cyclohexane first, after which the reactor was purged was nitrogen. Butadiene was then added followed by an 0.2 molar solution of n-butyllithium. The reactor was then placed in a constant temperature bath at 50° C. for 5 hours. At that time a portion of the contents of each reactor was shortstopped and the polymers coagulated by adding isopropyl alcohol. Sufficient of the isopropyl alcohol containing 10 weight percent of an antioxidant was added so as to give 1 part by weight of antioxidant per 100 parts by weight of the polymer. The coagulated polymers were then separated and dried overnight at 60° C. in a vacuum oven. The polymers so prepared and recovered were utilized as the control samples.

Varying amounts of a liquid xanthate-telechelic polymer, prepared as described in Example I, were added to the remaining contents of the reactors. The reactors were maintained at a temperature of 50° C. for 15 minutes after which the polymers were coagulated by adding isopropyl alcohol. The isopropyl alcohol contained 10 weight percent of an antioxidant, and sufficient of the alcohol was added to give 1 part by weight of antioxidant per 100 parts by weight of polymer. The coagulated polymers were then recovered and dried overnight in a vacuum oven at 60° C. The results of the runs are set forth below in Table II.

*Table II*

| Run No. | n-BuLi,[1] mhm. | Treating agent [2] | Cold flow, mg./min.[2] |
|---|---|---|---|
| 1 (Control) | 1.5 | | 137 |
| 2 | 1.5 | 1.2 | 0.4 |
| 3 (Control) | 1.5 | | 193 |
| 4 | 1.5 | 2.4 | 6.5 |
| 5 (Control) | 1.6 | | 245 |
| 6 | 1.6 | 1.4 | 1.9 |

[1] Millimols per 100 parts of butadiene.
[2] See appropriate footnote to Table I.

The data in the foregoing examples demonstrate that the tendency of cis-polybutadiene and organolithium-catalyzed polybutadiene to cold flow is substantially reduced by proceeding in accordance with the present invention.

EXAMPLE III

Two runs were carried out in which butadiene was polymerized in the presence of n-butyllithium. The following recipe was employed in the runs:

RECIPE

| | |
|---|---|
| Butadiene, parts by weight | 100 |
| Cyclohexane, parts by weight | 780 |
| n-Butyllithium, mhm.[1] | 1.6 |
| Temperature, °C. | 50 |
| Time, hrs. | 4 |

[1] Millimoles per 100 parts of butadiene.

The procedure followed in the polymerization was substantially the same as that described in Example II. One of the runs was a control run in which the reaction was shortstopped and the polymer was coagulated by adding isopropyl alcohol containing an antioxidant to the reaction mixture. In the run according to the present invention, the reaction was shortstopped by adding 0.6 milliequivalent per 100 parts of monomer of xanthate-telechelic polymer prepared as described in Example I. The reaction mixture was contacted with the treating agent at 50° C. for a period of 2 hours after which the polymer was coagulated by adding isopropyl alcohol containing an antioxidant. The polymers so prepared were compounded according to the following recipe after which they were cured at 307° F. for 30 minutes.

RECIPE

| | Parts by Weight | |
|---|---|---|
| Run No. | 1 | 2 |
| Polymer | 100 | 100 |
| Carbon black | 50 | 50 |
| Zinc oxide | 3 | 3 |
| Stearic acid | 2 | 2 |
| Flexamine [1] | 1 | 1 |
| Resin 731D [2] | 5 | 5 |
| Philrich 5 [3] | 5 | 5 |
| Sulfur | 1.75 | 1.75 |
| NOBS Special [4] | 1.1 | 1.1 |

[1] A physical mixture of a complex diarylamine-ketone reaction product (65%) and N,N'-diphenyl-p-phenylenediamine (35%).
[2] A disproportionated pale rosin stable to heat and light.
[3] A highly aromatic oil.
[4] N-oxydiethylene-2-benzothiazyl sulfenamide.

The properties of the cured and uncured polymers as well as their processing properties are shown below in Table III. Polymer A shown in the table was prepared according to the present invention as described above while Polymer B was the control sample.

*Table III*

RAW RUBBER PROPERTIES

| Polymer | A | B |
|---|---|---|
| Mooney (ML-4 at 212° F.)[1] | 39.0 | 37.1 |
| Cold flow, glass plate [2] | 2.31 | 4.64 |

PROCESSING PROPERTIES

| | A | B |
|---|---|---|
| Compounded Mooney (MS-1½ at 212° F.) [3] | 39.0 | 42.4 |
| Scorch at 280° F., min.[4] | 23.2 | 17.6 |
| Extrusion at 250° F.:[5] | | |
| In./min | 70.4 | 68.2 |
| G./min | 120 | 147 |
| Rating (Garvey Die) | 10+ | 7— |
| Feed rating (0–10 best) | 2 | 6 |
| Mill banding at 190° F.[6] | T | BL |
| Dispersion | Good | Poor |

PHYSICAL PROPERTIES (30 MIN. CURE AT 307° F.)

| | A | B |
|---|---|---|
| $\nu \times 10^4$, moles/cc.[7] | 1.95 | 2.06 |
| Compression set, percent [8] | 34.3 | 28.8 |
| 300% modulus, p.s.i.[9] | 1,230 | 1,130 |
| Tensile strength, p.s.i.[9] | 2,530 | 2,450 |
| Elongation, percent [9] | 480 | 490 |
| Max. tensile at 200° F., p.s.i.[9] | 1,240 | 1,190 |
| Tear strength at 200° F., lb./in.[10] | 115 | 95 |
| Heat build-up, $\Delta T$, °F.[11] | 56.5 | 54.7 |
| Resilience, percent [12] | 72.5 | 70.6 |
| Shore A hardness [13] | 63.0 | 66.0 |

OVEN AGED 24 HOURS AT 212° F.

| | A | B |
|---|---|---|
| 200% modulus, p.s.i.[9] | 1,300 | 1,200 |
| Tensile, p.s.i.[9] | 2,080 | 2,000 |
| Elongation, percent [9] | 270 | 290 |
| Heat build-up, $\Delta T$, °F.[11] | 41.2 | 45.6 |
| Resilience, percent [12] | 79.8 | 76.0 |
| Shore A hardness [13] | 69.5 | 70.5 |

[1] Mooney (ML-4 @ 212° F.)—ASTM D1646-61, Mooney Viscometer, large rotor, 212° F., 4 minutes.
[2] Cold Flow-Glass Plate Method—Method is based on the change in contact area of four right circular cylinders of rubber compressed between two glass plates. The cold flow rating is the ratio of the final contact area to the original contact area. Four pellets, approximately 0.450 inch in diameter and the same in height, are measured with a hand micrometer and recorded as thousandths of an inch. The average diameter is obtained and squared. Glass plates 3″ x 4″ weighing an average of 26–27 grams, which have been cleaned and polished with silicone lens tissue, are used for the test. Four rubber pellets are positioned at the corners of a 1.5″ x 2″ rectangle within the glass plate. Another glass plate is positioned over the top of the pellets such that it is directly over the bottom plate and a 160 gram 3″ x 4″ lead plate is placed on top. The assembly is allowed to stand 18 hours at 80° F. after which the lead weight is removed and the contact area observed through the glass plate. Measurement is first taken across the longest It is seen from the foregoing data that the polybutadiene prepared in accordance with this invention had a reduced tendency to cold flow and possessed good processing properties. The treated polybutadiene banded well and was appreciably better in this property and in extrusion appearance than the control polymer. The physical properties of the treated polybutadiene were generally superior to the properties of the control polymer.

EXAMPLE IV

A series of runs is carried out in which 1,3-butadiene is polymerized in the presence of n-butyllithium. The runs are conducted in accordance with the recipe shown in Example II. The procedure described in Example II is followed except that a liquid thioxanthate-telechelic polymer and a liquid dithiocarbamate-telechelic polymer are used in separate runs as treating agents instead of a xanthate-telechelic polymer. These liquid telechelic polymers are prepared according to the recipe shown in Example I except that 3 parts by weight of diisopropylthioxanthogen disulfide and 3 parts by weight of tetraisopropylthiuram disulfide are employed as modifiers instead of the 5 parts by weight of the diisopropylxanthogen disulfide. The polybutadiene products that are treated with these treating agents have a reduced tendency to cold flow.

As will be evident to those skilled in the art, many variations and modifications of the invention can be practiced in view of the foregoing disclosure. Such variations and modifications are believed to come within the spirit and scope of the invention.

I claim:

1. In a process wherein a polymerization reaction mixture is formed by polymerizing 1,3-butadiene in the presence of a hydrocarbon diluent with a catalyst system selected from the group consisting of: (1) a catalyst formed by mixing materials comprising an organo-compound of a Group I to III metal as a first component and an iodine containing second component including a titanium halide and (2) an organolithium catalyst, said polymerizing occurring at a temperature in the range of —100 to 250° F. and at a pressure sufficient to maintain said reaction mixture substantially in the liquid phase, the improvement which comprises adding to said reaction mixture a member selected from the group consisting of a liquid xanthate-telechelic polymer of a conjugated diene, a liquid thioxanthate-telechelic polymer of a conjugated diene, and a liquid dithiocarbamate-telechelic polymer of a conjugated diene, said member being added before inactivation of said catalyst system in an amount of from 0.1 to about 50 parts by weight per 100 parts by weight of polymerized 1,3-butadiene, said conjugated dienes having from 4 to 12 carbon atoms; maintaining said member in contact with said polymerization mixture at a temperature of —100 to 250° F. for a period in the range of 5 minutes to 50 hours; and recovering a polybutadiene product having a reduced tendency to cold flow.

2. A process according to claim 1 in which said member is a liquid xanthate-telechelic polymer of a conjugated diene containing end groups having the formula:

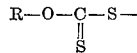

wherein R is selected from the group consisting of alkyl, cycloalkyl, aryl, alkaryl, and aralkyl radicals.

3. A process according to claim 1 in which said member is a liquid thioxanthate-telechelic polymer of a conjugated diene containing end groups having the formula:

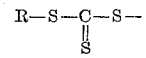

wherein R is selected from the group consisting of alkyl, cycloalkyl, aryl, alkaryl, and aralkyl radicals.

4. A process according to claim 1 in which said member is a liquid dithiocarbamate-telechelic polymer of a conjugated diene containing end groups having the formula:

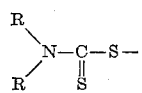

wherein R is selected from the group consisting of alkyl, cycloalkyl, aryl, alkaryl, and aralkyl radicals.

5. In a process wherein a polymerization reaction mixture is formed by polymerizing 1,3-butadiene with a catalyst system selected from the group consisting of (1) a catalyst formed by mixing materials comprising an organo-compound of a Group I to III metal as a first component and an iodine-containing second component including a titanium halide and (2) an organolithium catalyst, the improvement which comprises adding to said reaction mixture a member selected from the group consisting of a liquid xanthate-telechelic polymer of a conjugated diene, a liquid thioxanthate-telechelic polymer of a conjugated diene, and a liquid dithiocarbamate-telechelic polymer of a conjugated diene, said member being added before inactivation of said catalyst system, said conjugated dienes having from 4 to 12 carbon atoms, and recovering a polybutadiene product having a reduced tendency to cold flow in the unvulcanized state.

6. A process according to claim 1 in which said liquid telechelic polymer is a polymer of a conjugated diene having from 4 to 8 carbon atoms per molecule.

7. A process according to claim 1 in which said telechelic polymer is added to said reaction mixture as a solution in a hydrocarbon diluent.

8. A process according to claim 2 in which 1,3-butadiene is polymerized with a catalyst obtained by mixing a trialkylaluminum, titanium tetrachloride and iodine and a liquid xanthate-telechelic polymer of 1,3-butadiene is added to said reaction mixture.

9. A process according to claim 3 in which 1,3-butadiene is polymerized with a catalyst obtained by mixing a trialkylaluminum, titanium tetrachloride and titanium tetraiodide and a liquid thioxanthate-telechelic polymer of 1,3-butadiene is added to said reaction mixture.

10. A process according to claim 4 in which 1,3-butadiene is polymerized with a catalyst obtained by mixing a trialkylaluminum and titanium tetraiodide and a liquid dithiocarbamate - telechelic polymer of 1,3 - butadiene is added to said reaction mixture.

11. A process according to claim 2 in which 1,3-butadiene is polymerized with a catalyst having the formula $RLi_x$ wherein R is selected from the group consisting of

--- dimension of the contact area and a second measurement taken at right angles to the first one. The eight measurements (two for each pellet) are recorded and averaged to obtain a final average diameter. The value is squared and divided by the initial average diameter squared to obtain the cold flow.

[3] Compounded Mooney (MS 1½ @ 212° F.)—ASTM D1646–61, Mooney Viscometer, small rotor, 212° F., 1.5 minutes.

[4] Scorch @ 280° F. minutes to 5 point Mooney Rise—ASTM D1646–61, Mooney Viscometer, large rotor, scorch in minutes to 5 point rise above minimum Mooney.

[5] Extrusion @ 250° F.—No. ½ Royle Extruder with Garvey die. See Ind. Eng. Chem. 34, 1309 (1942). As regards the "rating" figure, 12 designates an extruded product considered to be perfectly formed whereas lower numerals indicate less perfect products.

[6] T—tight; BL—band and loosen.

[7] $\mu \times 10^4$, mole/cc.—Determined by the swelling method of Kraus as given in Rubber World, October 1956. This value is the number of effective network chains per unit volume of rubber. The higher the number, the more the rubber is cross-linked (vulcanized).

[8] Compression set, percent—ASTM D395–61, Method B (modified). Compression devices are used with 0.325 inch spacers to give a static compression for the one-half inch pellet of 35 percent. Test run for 2 hours at 212° F. plus relaxation for 1 hour at 212° F.

[9] ASTM D412–61T. Scott Tensile Machine L–6. Tests are made at 80° F. unless otherwise designated.

[10] ASTM D624–54, Die A.

[11] ASTM D623–58. Method A, Goodrich Flexometer, 143 lbs./sq. inch load, 0.175 inch stroke. Test specimen is a right circular cylinder 0.7 inch in diameter and 1 inch high.

[12] ASTM D945–59 (modified). Yerzley oscillograph. Test specimen is a right circular cylinder 0.7 inch in diameter and 1 inch high.

[13] ASTM—D676–59T. Shore Durometer, Type A.

aliphatic, cycloaliphatic and aromatic radicals and $x$ is an integer from 1 to 4, inclusive, and a liquid xanthate-telechelic polymer of a conjugated diene is added to said polymerization mixture.

12. A process according to claim 11 in which said $RLi_x$ compound is an alkyllithium compound.

13. A rubbery, unvulcanized composition of matter which is prepared by polymerizing 1,3-butadiene with a catalyst system selected from the group consisting of (1) a catalyst formed by mixing materials comprising an organo-compound of a Group I to III metal as a first component and an iodine-containing second component including a titanium halide and (2) an organolithium catalyst in the presence of a hydrocarbon diluent; adding to the resulting reaction mixture a member selected from the group consisting of a liquid xanthate-telechelic polymer of a conjugated diene, a liquid thioxanthate-telechelic polymer of a conjugated diene, and a liquid dithiocarbamate-telechelic polymer of a conjugated diene, said member being added before inactivation of said catalyst system in an amount of 0.1 to about 50 parts by weight per 100 parts by weight of polymerized 1,3-butadiene, said conjugated dienes having from 4 to 12 carbon atoms, and removing hydrocarbon diluent from the treated reaction mixture.

14. A composition of matter according to claim 13 in which said member is a liquid xanthate-telechelic polymer of 1,3-butadiene.

References Cited by the Examiner
UNITED STATES PATENTS

| | | | |
|---|---|---|---|
| 2,234,204 | 3/41 | Starkweather et al. | 260—94.4 |
| 3,074,924 | 1/63 | Kizer et al. | 260—94.2 |

JOSEPH L. SCHOFER, *Primary Examiner.*

LEON J. BERCOVITZ, *Examiner.*